Aug. 19, 1952  H. R. McVICAR  2,607,176
ROLLER AND HARROW IMPLEMENT
Filed Nov. 28, 1945  2 SHEETS—SHEET 2
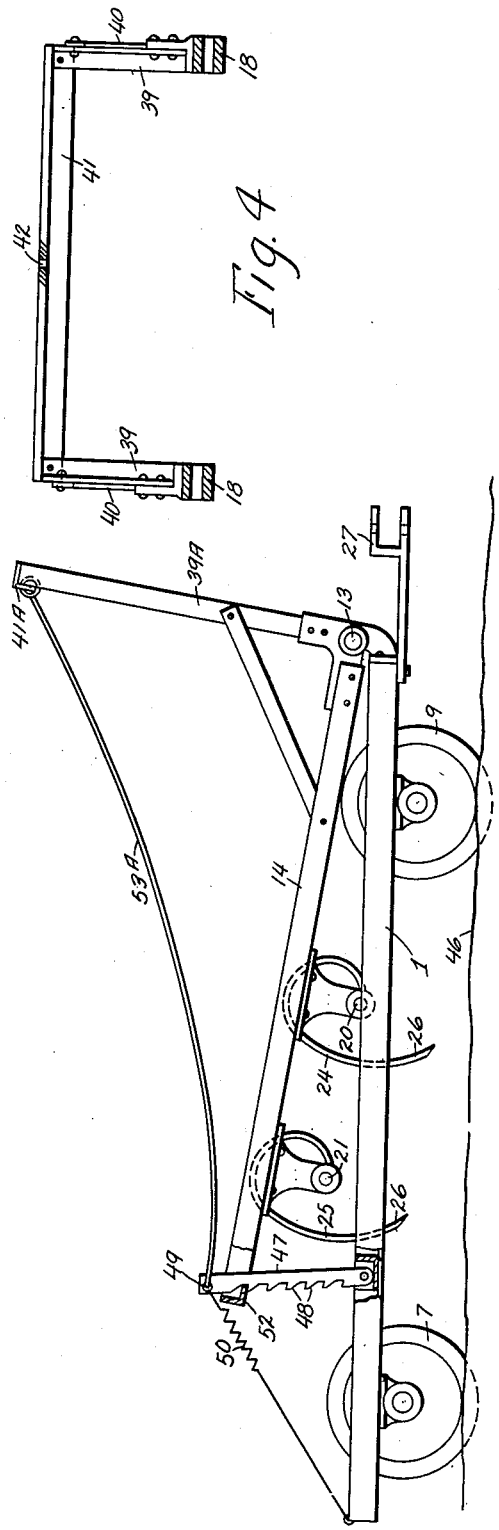
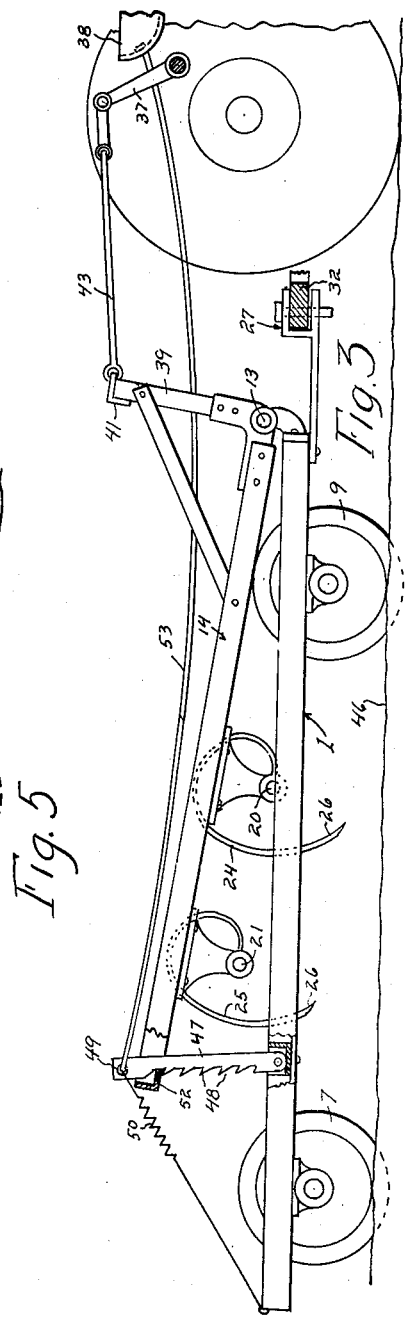
INVENTOR
Harold R. McVicar
By Harry P. Canfield
ATTORNEY Patented Aug. 19, 1952

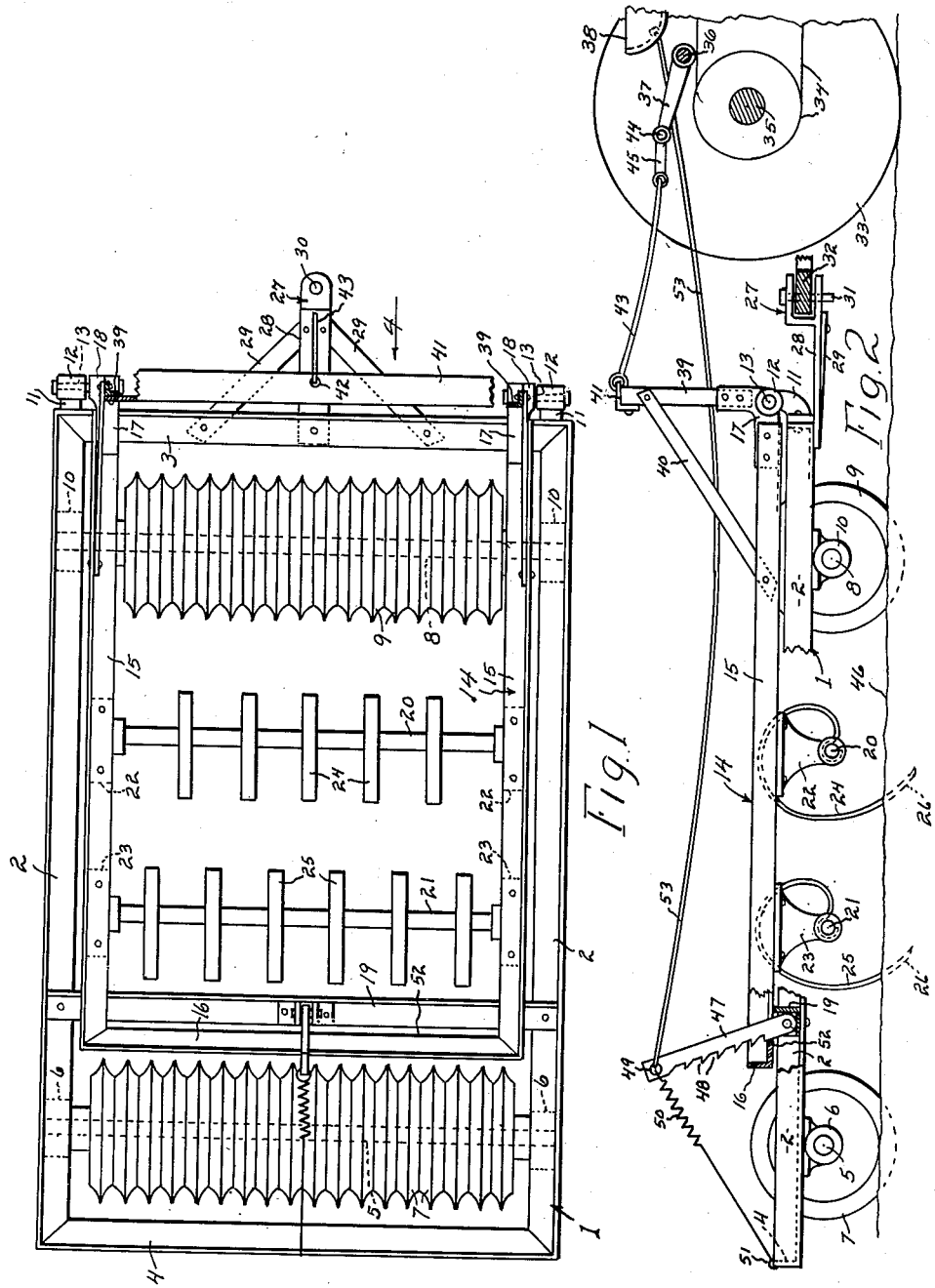

2,607,176

UNITED STATES PATENT OFFICE 2,607,176

ROLLER AND HARROW IMPLEMENT

Harold R. McVicar, Berea, Ohio

Application November 28, 1945, Serial No. 631,309

4 Claims. (Cl. 55—12)

This invention relates to agricultural tillage and cultivating implements of the general class comprising both roller elements and toothed elements, to work the soil when propelled thereover.

In one type of such implements, one or more gangs of roller elements are provided, and each gang comprises a plurality of discs and each disc has a periphery of V-shape in cross section; and all are mounted to rotate independently of each other on a gang shaft, and to roll upon the ground to support the implement as a whole, and to perform a well known soil working operation; and one or more gangs of soil working teeth are provided for penetrating and plowing or harrowing the soil; and it is to this general type of implement that the invention more particularly relates.

In such implements, various mechanisms have been proposed to lower the teeth to project them into the soil to working position, and to raise them out of the soil for transportation of the implement to and from a field or to make turns at the end of a field, and to regulate or adjust the depth at which the teeth work the soil.

Such prior mechanisms however have been objectionable for various reasons, among which are that attention and care must be exercised to set the teeth to the desired depth each time they are lowered after being raised, and that they are not adapted to be lowered and raised or adjusted as to working depth by power from an implement propelling tractor.

It is accordingly the primary object of this invention to provide an implement of this class in which these objections to prior implements have been overcome.

Other objects will become apparent to those skilled in the art to which the invention appertains.

The invention is fully disclosed in the following description taken in connection with the accompanying drawing, in which:

Fig. 1 is a top plan view of an agricultural implement embodying the invention with parts broken away and parts in section;

Fig. 2 is a side elevational view of the implement of Fig. 1 with parts broken away and parts in section, and showing diagrammatically, part of a tractor connected thereto;

Fig. 3 is a view generally similar to Fig. 2 but with parts in different operative positions;

Fig. 4 is a fragmentary view, partly in section, taken in the direction of the arrow 4 of Fig. 1 and, Fig. 5 is a view similar to Fig. 3 but illustrating an alternative structure and mode of operation which may be utilized.

Referring to the drawing, there is shown at 1 a main or primary frame comprising side elements 2—2, and front and rear end elements 3 and 4, which may conveniently be made from angle section steel as indicated. The frame as shown is rectangular and the end and side elements are joined together at the corners. Means for joining the elements has not been shown, inasmuch as it is not an essential part of the invention, and such structures being well understood by those skilled in the art.

At the rear portion of the frame 1 is a transverse shaft 5 mounted at its opposite ends in supports 6—6 secured to the side members 2—2 of the main frame. Rotatably mounted on the shaft 5 is a series or gang of discs 7—7, the peripheries of which are V-shape in cross section as shown, and the discs may rotate independently of each other on the shaft 5.

In the forward part of the frame 1 is a similar shaft 8 and a gang of similar discs 9—9 thereon, the shaft being mounted in supports 10—10 on the main frame.

Such discs and gangs of discs are well known in this art. They function as rollers or wheels, supporting the main frame 1 as it is propelled along the soil, and the peripheries of the discs perform a well known soil working operation as they roll along.

At the forward part of the main frame 1, and at opposite sides thereof is a pair of arms 11—11, extending upwardly therefrom and carrying at their ends, sleeve bearings 12—12 having pivot pins 13—13 extending therethrough, providing a transverse horizontal hinging axis; and upon the pins is pivotally or hingingly mounted a supplemental frame shown generally at 14. This supplemental frame comprises side elements 15—15 and a rearward transverse element 16, which elements may conveniently be made from angle section steel as indicated, joined together in any suitable manner well known in the art. The forward ends of the side elements 15—15 have mounted thereon L-shaped bearing elements 17—17, provided with sleeve bearings 18—18 rotatably mounted on the said pins 13—13, whereby the forward end of the supplemental frame 14 is hingingly supported. Adjacent to the rearward end of the supplemental frame 14, it rests upon a transverse angle section element 19 extending transversely of the main frame and secured at its opposite ends to the side members 2—2 thereof; and upon which the rear end of the supplemental frame 14 is normally supported.

Preferably the supplemental frame 14 is in general horizontally parallel to the main frame 1 as shown in the drawing.

A pair of transverse shafts 20 and 21 extend across the supplemental frame 14 being secured at their opposite ends to depending brackets 22—22 and 23—23 secured to the side elements of the supplemental frame, and the shafts 20 and 21 are non-rotatively secured in the said brackets.

Attached to the shaft 20 is a plurality of transversely spaced teeth 24—24; and secured to the shaft 21 is a similar set of transversely spaced teeth 25—25; the forward teeth 24 being staggered with respect to the rearward teeth 25.

In the form of the invention illustrated in the drawing, these teeth are of the well known spring tooth type, having end portions 26—26 as shown in Fig. 2 for penetrating and working the soil, and coiled resilient portions thereabove, the ends of which are rigidly, non-rotatively, secured to the shafts 21 and 22 in a well known manner.

In prior implements of this general class in which spring teeth of this type have been employed, the shafts (corresponding to the shafts 21 and 20) to which the teeth are attached, have been mounted to be rotatable, whereby upon rotation thereof the ground engaging portions (corresponding to the portions 26—26) may be elevated out of the ground or projected into it; but in the present invention the spring teeth 24 and 25 are rigidly attached to their shafts 20 and 21 and the shafts themselves are rigidly or non-rotatively attached to their supporting brackets 22 and 23, so that the teeth are fixed in relative positions with respect to the supplemental frame 14.

The full advantages of the invention are best developed when the teeth are inclined downwardly forwardly as shown for the soil penetrating portions 26 of the teeth, so that as the implement is drawn forwardly the teeth are thereby drawn downwardly into the soil by an action generally referred to in this art as "suction."

The main frame 1 has a tractor hitch shown generally at 27 extending forwardly from the forward member 3 of the frame; and it may comprise a main draw bar element 28, connected to the frame elements 3, and braced by diagonal braces 29—29, connected to it and to the main frame; and in its forward portion may comprise as shown in Fig. 1, a king pin connection hole 30. In Fig. 2, the king pin is shown at 31 projected through a suitable king pin hole in the draw bar 32 of a tractor.

The tractor is shown in Fig. 2, diagrammatically, as comprising main drive wheels 33, a rear axle housing and main frame 34, a rear axle 35; and the draw bar 32 is connected to the tractor by the usual structure not shown, whereby the implement may be propelled forwardly by the tractor.

Agricultural tractors are well known comprising besides the main forward draft element or draw bar 32, an auxiliary power device for actuating parts of the implement being drawn by the tractor. One well known type comprises an arm or arms which may be rocked forwardly by the tractor power, and free to be retracted or rocked rearwardly when the power is released therefrom, and a tractor of this type has been illustrated diagrammatically. At 36 is illustrated a transverse shaft on which is an arm or arms 37; and the auxiliary power when applied thereto rotates the shaft 36 to rock the arm 37 clockwise with the shaft.

Such tractors being well known, it is not deemed necessary to further illustrate or describe the auxiliary power arrangement here referred to. It is to be noted however that in the well known type of mechanism here referred to, clockwise rocking of the arm 37 is communicated to generally horizontal rearwardly extending frame members pivoted on the tractor and the frame members may be used to exert an upward lifting force on an implement; and the mechanism is therefore sometimes designated as a "power lift" mechanism; but as utilized by applicant and as illustrated, the said frame members are omitted and the clockwise rocking of the arm 37 is used to exert a forward rectilinear auxiliary draft, to be described.

At 38 is illustrated fragmentarily part of the operator's seat of the tractor.

Secured to and extending upwardly from each of the aforesaid elements 17—17, are posts 39—39 which may conveniently be of angle section steel, and they are braced by braces 40 between the posts and the side elements 15 of the supplemental frame; and they are connected together transversely at the top by a bridging bar 41, which may conveniently be of angle section steel secured to the top of the posts. A perforation 42 is provided in one of the flanges of the angle section bar 41, and a rope, chain, or cable 43 is linked through the perforation and forwardly thereof is pivotally connected at 44 by a link 45 to the aforesaid auxiliary power arm 37 of the tractor.

During the forward propulsion of the implement by the tractor as described, the aforementioned suction of the teeth 24 and 25 in the soil, maintains them at a working depth in the soil, and they work the soil in a well known manner; and the suction, exerting downward thrust on the supplemental frame 14, holds it rocked in the counterclockwise direction as viewed in Fig. 2, and engaged with and supported by the transverse bar 19 at its rearward portion.

As hereinbefore mentioned, it is desirable or necessary in making turns at the end of a field being worked or during transportation of the implement to and from the field, to withdraw the teeth 24 and 25 out of the soil, and this is done by rocking the supplemental frame 14 clockwise around its pivot pins 13—13 by means of the auxiliary power of the tractor.

When the auxiliary power is turned on, the arm 37 on the tractor rocks clockwise as viewed in Fig. 2 and exerts forward draft on the cable 43, thereby exerting force or torque on the supplemental frame, and it is rocked thereby, elevating all parts rearwardly of the pivot pins 13, and, for example, it may be rocked to an extreme position illustrated in Fig. 3.

If desired, the auxiliary draft may be maintained applied to the arm 37 to hold the supplemental frame 14 in its elevation position, with the ends 26—26 of the teeth above the ground level, indicated at 46. When it is again desired to project the teeth into the soil, and at such time, the auxiliary draft is released and the weight of the supplemental frame 14 will return it downwardly counterclockwise, and the teeth ends 26—26 will again engage the soil and by their said suction draw them into the soil until the supplemental frame is again in its normal working position of Fig. 2.

However, I prefer to use another means to support the supplemental frame and the teeth in their elevated positions, and I prefer to employ such means because it functions also to adjust the working depth of the teeth in the soil; and this will now be described.

Pivotally supported at approximately the center of the transverse bar 19 of the main frame, is a latch device 47 extending upwardly therefrom and provided with a series of teeth 48. In its upper end is a perforation 49 in which one end of a tension spring 50 is hooked, the other end of the spring being connected at 51 to the rear member 4 of the main frame, the spring constantly exerting torque on the latch 47 tending to rotate it in the counterclockwise direction. The teeth 48 are disposed forwardly of the edge 52 of the rear channel section member 16 of the supplemental frame.

When the supplemental frame is raised by auxiliary tractor power as described, its edge 52 ratchets over the teeth 48 of the latch. When the edge 52 has moved upwardly to engage one of the uppermost teeth of the latch, the auxiliary tractor power may be discontinued and released, and the supplemental frame will remain in elevated position being supported at its rearward end by the latch.

To return the teeth into the soil, the latch may be tripped by rocking it clockwise and to this end, a rope, chain, or cable 53 (Fig. 2) is secured at one end in the perforation 49 and extends forwardly to and is attached to a convenient point on the tractor easily accessible to an operator on the seat 38; for example it may be projected through one of the perforations commonly provided in such seats and knotted therein. The operator by grasping the cable 53 and pulling forwardly on it, releases the latch, and the supplemental frame 14 drops by gravity to its normal working position; the pull on the cable 43, effected thereby, returning the arm 37 to its normal released position.

To adjust the working depth of the teeth in the soil, the operator operates the auxiliary tractor power mechanism to rock the supplemental frame 14, thereby ratcheting the edge 52 over the teeth 48, to any selected intermediate tooth on the latch, and then releases the auxiliary power, and the supplemental frame 14 will remain in that position being supported by the latch as described.

Thus at any time the teeth may be lowered to their maximum working depth, or raised and latched at a lesser depth, or elevated entirely out of the ground, and again lowered to full depth or adjusted to a lesser depth, all by the power of the tractor and actuated and controlled by the operator, and without leaving the seat of the tractor; and these operations may be performed by him while the implement is being propelled forwardly.

The soil being worked with an implement of this class is often covered with trash; and the trash collects in front of the teeth. In the present implement the teeth can be cleared of trash without inconvenience by simply raising them out of the ground, and lowering them again to working position as described.

While I have illustrated and described teeth of the spring-tooth type, the invention may be practiced with other types of teeth attached in any suitable manner to the shafts 20 and 21; and preferably set at an angle to be drawn into the soil by suction as referred to and instead of separate teeth rigidly attached to the shafts 20 and 21, wheel hoes having radial teeth and rotatably mounted on the shafts 20 and 21 may be employed. Also instead of actual teeth, soil working tools of the dished disc type, commonly employed on disc-harrows may be rotatably mounted on the shafts 20 and 21, and preferably set at an angle to exert the suction referred to, in their well known manner of operating.

Also while I have shown roller type tools 7 and 9 of the type having V-shaped peripheries, other known or suitable types may be utilized.

While I have shown and described two gangs of roller elements and two gangs of tooth-elements, it is believed to be apparent without further illustration or description that one or the other of the gangs of roller elements may be omitted, in which case the attachment of the forward part of the main frame to the tractor draw-bar would reliably maintain the main frame generally horizontal as shown; and that either of the gangs of tooth-elements could likewise be omitted; whereby a simpler and cheaper implement embodying the invention may be had when wanted.

Also, if desired, the forward shaft 20 and its gang of tools may be located farther forward, and the forward shaft 8 and its gang of roller elements may be located just forwardly of the rear gang of tools on the shaft 21.

It is believed that those skilled in the art will know how to make these changes and modifications of the invention without further illustration or description.

The full advantages of the invention are best developed when the implement as described is drawn by a tractor having an auxiliary power draft mechanism as described. Some of its advantages however may be enjoyed when propelled by a tractor not having an auxiliary power draft mechanism or when propelled by draft animals.

A modification of the implement for this mode of operation is shown in Fig. 5.

The propelling draft, as in the form of Figs. 1, 2 and 3, is applied to the hitch 27. To elevate and adjust the depth of the teeth of the implement, the supplemental frame 14 is to be rocked by hand by an operator standing in front of the implement; and to facilitate this operation by providing greater leverage, the above described posts 39 of Figs. 1 to 3 are extended farther upwardly, as at 39A, and the bridging bar, here 41A, serves as a handle. The latch tripping cable, here 53A, is attached at its forward end to the handle to be conveniently reached by the operator. The mode of operation otherwise is the same as for auxiliary tractor power. As will now be apparent, the forward draft on the supplemental frame 14, as set forth in the appended claims, describes either the forward draft by auxiliary tractor power or by manual power.

For the foregoing reasons, my invention is not limited to the details of construction illustrated. Changes and modifications as referred to, and others, may be made; and my invention comprehends all such changes and modifications which come within the scope of the appended claims.

I claim:

1. In a tillage implement, a main frame; a pair of forwardly and rearwardly spaced gangs of rotary tools, extending transversely of the frame on fixed rotational axes, and rollingly supporting the frame for propulsion over the soil, and for working the soil; a supplemental frame supporting a gang of supplemental soil working tools and having a hinge connection with the main frame forwardly of the supplemental tools; mutually engaged stop means on the two frames rearwardly of the hinge connection to support the supplemental frame and its tools with the tools in a position of maximum soil-working depth; a main connection on the main frame by which it may be propelled by forward draft; a supplemental connection on the supplemental frame above the hinge connection by which the supplemental frame and its tools may be rocked bodily on the hinge connection to elevate the tools upon application of forward draft to the supplemental connection; and a pawl and ratchet type latch means for automatically latching the supplement frame in different selected elevated positions.

2. In a tillage implement, a main frame; a pair of forwardly and rearwardly spaced gangs of rotary tools, extending transversely of the frame on fixed rotational axes, and rollingly supporting the frame for propulsion over the soil, and for working the soil; a supplemental frame supporting a gang of supplemental soil working tools and having a hinge connection with the main frame forwardly of the supplemental tools; mutually engaged stop means on the two frames rearwardly of the hinge connection to support the supplemental frame and its tools with the tools in a position of maximum soil-working depth; a main connection on the main frame by which it may be propelled by forward draft; a supplemental connection on the supplemental frame above the hinge connection by which the supplemental frame and its tools may be rocked bodily on the hinge connection to elevate the supplemental tools upon application of forward draft to the supplemental connection; and a pawl and ratchet type latch means for automatically latching the supplement frame in different selected elevated positions; and latch tripping means extending forwardly and operable by an operator forwardly of the implement.

3. A tillage implement for operation by a tractor of the type having a seat and a main draft hitch, and an auxiliary power draft hitch having generally forward and rearward movement; comprising: a main frame having a forward connection to which the main draft hitch may be connected; a gang of roller-elements on the main frame for working the soil and rollingly supporting the main frame and extending transversely of the main frame and rotatable on fixed rotational axes; a gang of supplemental soil working tools; a supplemental frame on which the supplemental tools are mounted; a pivot support on the main frame forwardly of the gang of supplemental tools, upon which the supplemental frame may rotate to elevate the gang of supplemental tools bodily as a unit with respect to the soil depth positions thereof; a connection extending forwardly from a point on the auxiliary frame above the pivot to which the auxiliary draft hitch may be connected by which the auxiliary frame may be so rotated upon forward movement of the auxiliary draft hitch; latch means of the automatically engageable pawl and ratchet type to support the auxiliary frame in selected elevated position upon cessation of forward auxiliary draft; means to trip the latch extending forwardly and operable from the tractor seat to permit the supplemental frame and tools to return downwardly bodily as a unit; stop means on the main frame and supplemental frame mutually engageable to support the supplemental frame rearwardly of the pivot support and stop downward movement of the supplemental tools, at a preselected maximum soil working depth.

4. A tillage implement comprising a main frame; forward and rearward gangs of roller-elements for working the soil extending transversely of the frame and rotatable thereon on fixed axes and rollingly supporting the main frame; a supplemental frame supporting a gang of soil working tooth-elements between the gangs of roller elements and hingingly connected to the main frame forwardly of the tooth-elements; stop means on the main and supplemental frames, mutually engageable to support the supplemental frame against gravity rearwardly of the hinging axis, and to position the tooth-elements at maximum soil working depth; the supplemental frame being hingingly movable to elevate the tooth-elements bodily; a connection on a forward part of the main frame at which draft power may be applied to propel the implement; a riser rigidly connected to a forward portion of the supplemental frame to which forward draft power may be applied to hingingly elevate the supplemental frame; a pawl and ratchet type latch means at the rear of the frame for automatically latching the supplemental frame in selected elevated positions, to adjust the soil-working depth of the tooth-elements and to clear them from the soil; a connection extending forwardly from the latch means by which it may be tripped to allow the supplemental frame to return by gravity to the said supported position.

HAROLD R. McVICAR.

REFERENCES CITED

The following references are of record in the file of this patent:

UNITED STATES PATENTS

| Number | Name | Date |
|---|---|---|
| Re. 21,601 | Buhr | Oct. 22, 1940 |
| 1,041,684 | Shay | Oct. 15, 1912 |
| 1,493,448 | Krotz | May 6, 1924 |
| 2,198,864 | Degrelle | Apr. 30, 1940 |